(12) United States Patent
Oka et al.

(10) Patent No.: US 10,857,775 B2
(45) Date of Patent: Dec. 8, 2020

(54) LAMINATING APPARATUS

(71) Applicant: LAMI CORPORATION INC., Osaka (JP)

(72) Inventors: Mamoru Oka, Osaka (JP); Katsuyoshi Fujiwara, Osaka (JP)

(73) Assignee: LAMI CORPORATION INC., Osaka (JP)

( * ) Notice: Subject to any disclaimer, the term of this patent is extended or adjusted under 35 U.S.C. 154(b) by 0 days.

(21) Appl. No.: 16/304,480

(22) PCT Filed: May 26, 2017

(86) PCT No.: PCT/JP2017/019776
§ 371 (c)(1),
(2) Date: Nov. 26, 2018

(87) PCT Pub. No.: WO2017/204344
PCT Pub. Date: Nov. 30, 2017

(65) Prior Publication Data
US 2019/0176456 A1    Jun. 13, 2019

(30) Foreign Application Priority Data
May 27, 2016   (JP) .................... 2016-106346

(51) Int. Cl.
| B32B 37/00 | (2006.01) |
| B32B 38/00 | (2006.01) |
| B32B 37/22 | (2006.01) |
| B29C 63/02 | (2006.01) |
| B32B 27/10 | (2006.01) |
| B29C 65/74 | (2006.01) |

(52) U.S. Cl.
CPC .......... *B32B 38/0004* (2013.01); *B29C 63/02* (2013.01); *B32B 27/10* (2013.01); *B32B 37/223* (2013.01)

(58) Field of Classification Search
CPC ..... B32B 38/0004; B32B 37/23; B32B 27/10; B29C 63/02
See application file for complete search history.

(56) References Cited

U.S. PATENT DOCUMENTS 6,431,243 B1 *   8/2002   Ito ..................... B32B 37/226
                                                    156/555
2007/0204961 A1 *   9/2007   Nakashima ........... B29C 63/02
                                                    156/583.1

* cited by examiner

*Primary Examiner* — Mark A Osele
*Assistant Examiner* — Christopher C Caillouet
(74) *Attorney, Agent, or Firm* — Wenderoth, Lind & Ponack, L.L.P.

(57) ABSTRACT

A laminating apparatus, in which films can be heated sufficiently, has a simple structure and allows films to be loaded easily. The laminating apparatus includes a sheet feed mechanism unit configured to convey a sheet into an apparatus main body, a film supply unit, and a press-bonding mechanism unit configured to perform a thermal press-bonding process while sandwiching the sheet between a pair of films. A sheet feed unit including the sheet feed mechanism unit is appropriately changeable between an open state and a closed state. The film supply unit includes rollers at supply positions where the films sufficiently wind around heating rollers of the press-bonding mechanism unit. The sheet feed unit includes counter rollers configured to abut the rollers in the closed state and separate from the rollers in the open state.

11 Claims, 3 Drawing Sheets

[FIG.1]
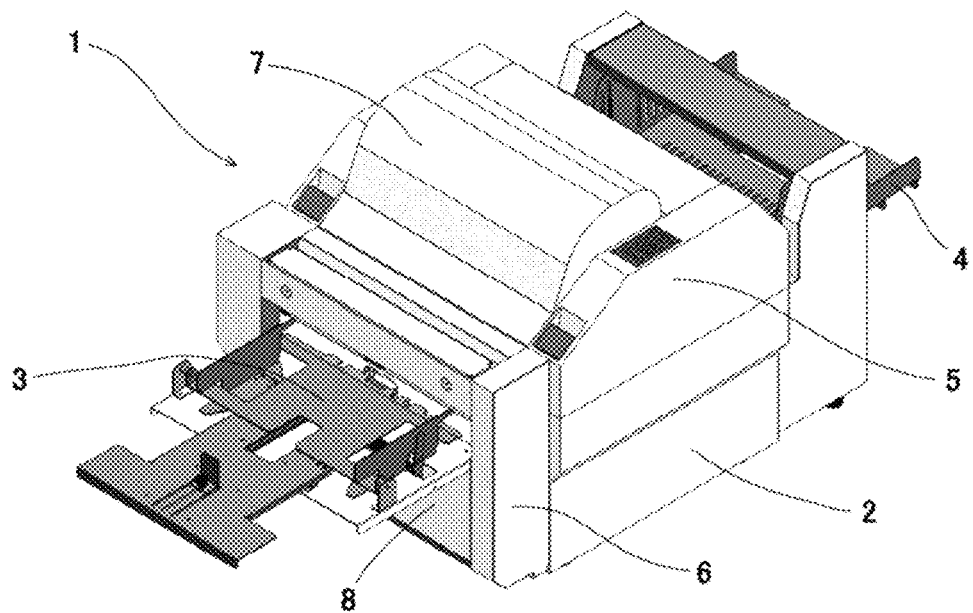
[FIG.2]
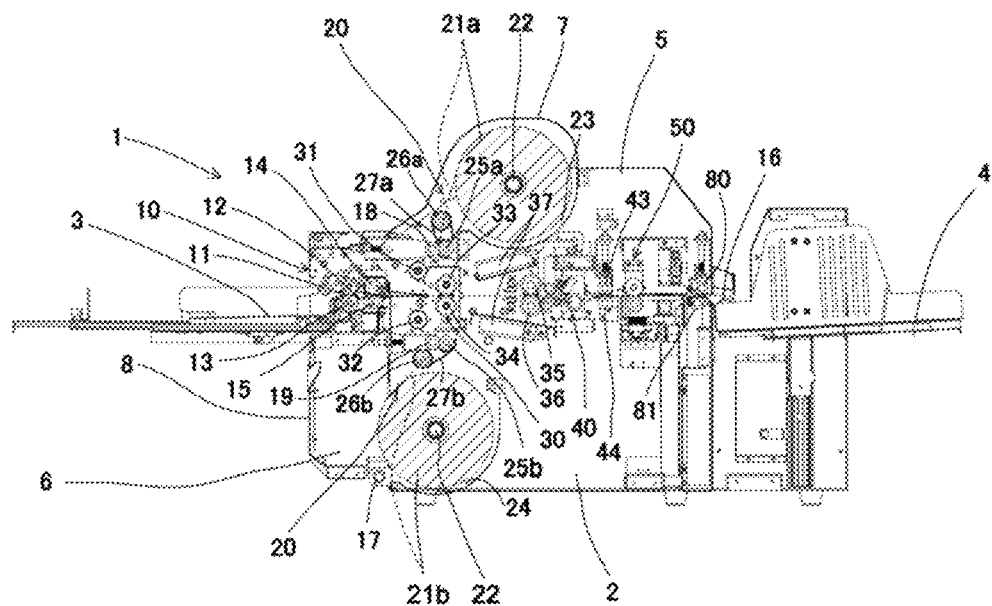

[FIG.3]
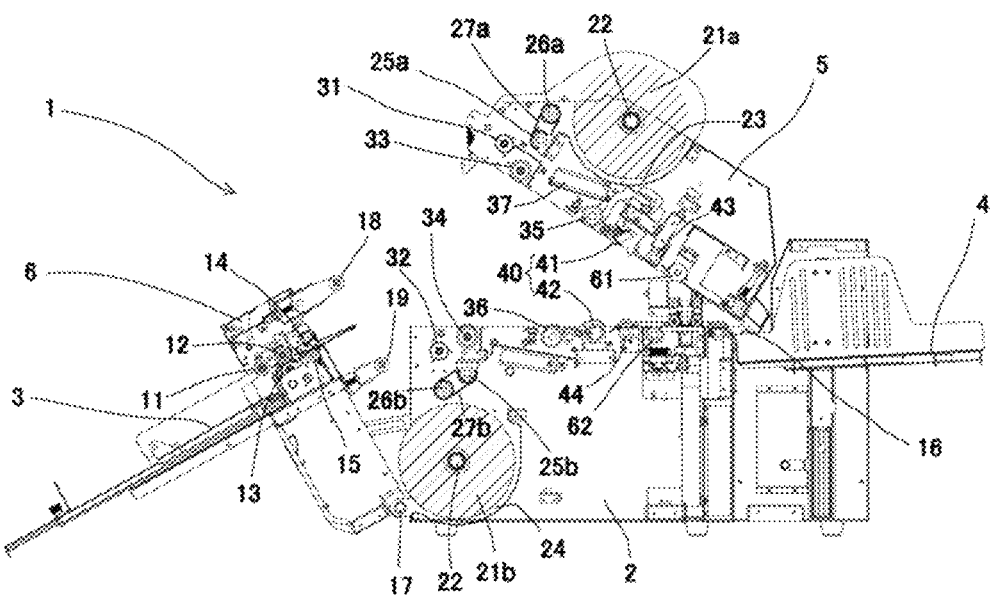
[FIG.4]
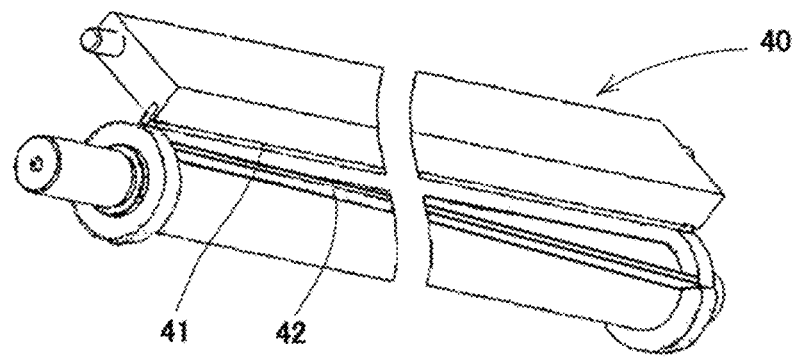

[FIG.5]
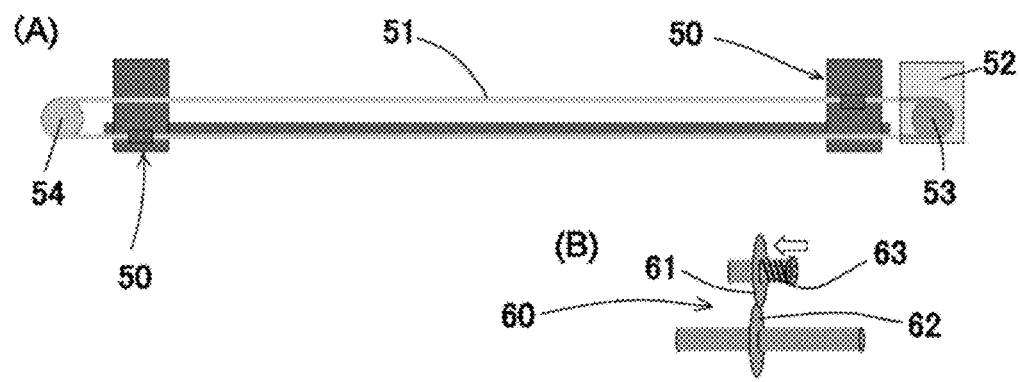
[FIG.6]
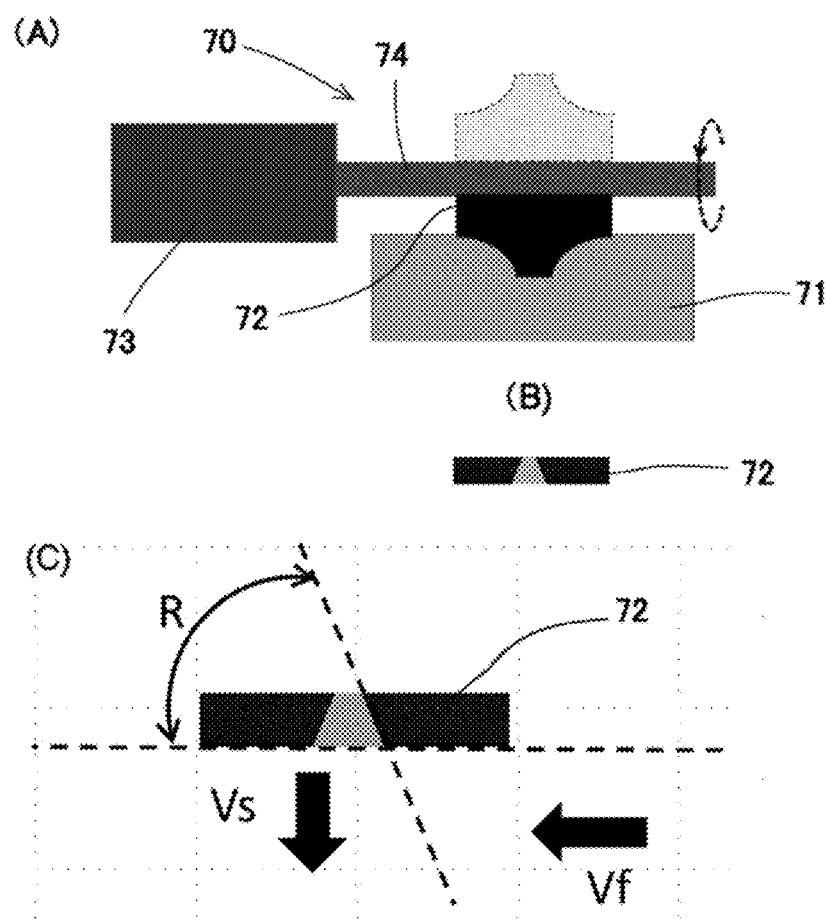

LAMINATING APPARATUS

TECHNICAL FIELD

The present invention relates to a laminating apparatus used for a laminating process for a purpose of improving durability and water resistance of various types of paper. More particularly, the present invention relates to a laminating apparatus that enables laminate films to be loaded easily, and enables four sides of a film to be cut easily.

BACKGROUND ART

For the purpose of improving durability and water resistance of various kinds of paper such as cards including business cards and restaurant menu, a laminating process is carried out by sandwiching both sides of paper with sheets of synthetic resin films. A laminating apparatus which enables the laminating process to be performed automatically has been conventionally used.

There are various structures of the laminating apparatus, but most of them are made by winding a long synthetic resin film for laminating (hereinafter simply referred to as "film") around a film shaft into a cylindrical shape and then installed in a laminating apparatus. At the time of performing a laminating operation, the film is drawn out of the cylindrical roll and laminated on an object to be laminated such as a sheet in the apparatus, and thereby the laminating operation is carried out.

Meanwhile, in the laminating operation, a glue surface on one side of a film is superimposed on an object to be laminated, and the glue of the film is heated and the film is pressed to adhere to the object to be laminated. If the heating is insufficient, a failure occurs in the laminating process.

Therefore, it has been proposed to provide a position-movable guide roller and guide a film to a laminating roller for thermal press-bonding via the guide roller, whereby a larger amount of the film is wound around the laminating roller so that the film can be sufficiently heated (for example, refer to Patent Literature 1).

Further, even for drawing of a film, if the film is drawn out too much, there is also a possibility that the film wrinkles on the surface of an object to be laminated and sticks, or that a defective product of lamination, such as positional deviation of the film, is generated.

Therefore, it has also been proposed to apply a constant braking force to drawing of the film by applying a constant load to a shaft holding a roll of the film or to a film holding unit in the middle of supplying the film, to thereby prevent generation of a defective product (for example, refer to Patent Literature 2).

In addition, a laminating operation is carried out by selecting an appropriate width of a film for lamination according to a size of a sheet to be laminated, and after the laminating operation, the film supplied in a long length is cut in a width direction at a space between laminated objects, and is automatically divided for every sheet.

However, some sheets do not conform to size standards such as A4, B5, and the like. In that case, a large margin is generated in both end portions in the width direction of the film, so that the film needs to be cut until the margin has an optimum width after the laminating operation.

Therefore, a laminating apparatus configured to cut a film in a feeding direction (longitudinal direction) at the same time as a laminating operation, and leave a margin of an arbitrary width has been proposed (refer to Patent Literature 3, for example).

CITATION LIST

Patent Literature 1: JP 2006-015516 A
Patent Literature 2: JP 2007-283728 A
Patent Literature 3: JP 2000-103026 A

SUMMARY OF INVENTION

Technical Problems

However, in the laminating apparatus using the method of Patent Literature 1, although heating of a film is sufficient, a movable mechanism of a guide roller is required. A structure thereof is complicated, requiring high cost. Further, it is necessary to move the guide roller with a lever or the like. Accordingly, there is a possibility that a defective product may be generated when a position change of the guide roller is forgotten.

Moreover, even for a method of applying a brake to a film, it is difficult to precisely adjust a braking force in a method of applying a load to a shaft of a film roll. On the other hand, in adjusting a load by a film holding unit in the middle of supplying a film like a laminating apparatus using the method of Patent Literature 2, a precise braking force can be obtained, but the film holding unit has a complicated structure. Accordingly, it is difficult to set a film, and skill is required. Furthermore, as the structure is complicated and a large space is needed, there is a problem that it is disadvantageous in terms of cost.

Furthermore, with the laminating apparatus of Patent Literature 3, it is possible to automatically perform a laminating process with an optimum margin in the width direction of the film even for a sheet having a nonstandard size. However, as four corners of a film are right-angled and sharp, there is a risk of damaging a human body such as a hand and a surrounding member. Therefore, it is necessary to cut the four corners into a round shape in post processing, so that a laminated object cannot be used immediately after it is taken out from the laminating apparatus.

Therefore, an object of the present invention is to provide a laminating apparatus in which a film can be heated sufficiently, a brake for a film to be drawn can be adjusted precisely, and a structure thereof is simple and a film can be loaded easily.

Another object is to provide a laminating apparatus configured to automatically cut a film along a film delivery direction, and cut four corners of a film of a laminated object, so that the laminated object can be used immediately after it is taken out.

Solution to Problems

In order to solve the aforementioned problems, the invention of claim 1 is a laminating apparatus including a sheet feed mechanism unit configured to convey a sheet to be laminated into an apparatus main body, a film supply unit in which a pair of films for lamination is stored, the film supply unit being detachable from the apparatus main body, and a press-bonding mechanism unit configured to, while sandwiching the sheet with the pair of films delivered from the film supply unit, heat and press-bond the sheet to perform a laminating process in the apparatus main body. A state of a sheet feed unit including the sheet feed mechanism unit is appropriately changeable between an open state in which the sheet feed unit is separated from the apparatus main body and a closed state in which the sheet feed unit is connected with the apparatus main body. The film supply unit includes a roller or a pad at a film supply position such that each of the pair of films sufficiently winds around a heating roller of the press-bonding mechanism unit when the film is supplied to the press-bonding mechanism unit. The sheet feed unit includes a counter roller configured to abut the roller or the pad of the film supply unit in the closed state and separate from the roller or the pad of the film supply unit in the open state, and in the closed state, the film is sandwiched between the roller or the pad of the film supply unit and the counter roller.

The invention of claim 2 employs a configuration that in the laminating apparatus according to claim 1, the roller of the film supply unit is mechanically connected with a slipping brake adjustable to have a predetermined tension.

The invention of claim 3 employs a configuration that in the laminating apparatus according to claim 1, the counter roller of the sheet feed unit is mechanically connected with a slipping brake adjustable to have a predetermined tension.

The invention of claim 4 is a laminating apparatus including a sheet feed mechanism unit configured to convey a sheet to be laminated into an apparatus main body, a film supply unit in which a pair of films for lamination is stored, the film supply unit being detachable from the apparatus main body, a press-bonding mechanism unit configured to, while sandwiching the sheet with the pair of films delivered from the cassette, heat and press-bond the sheet and the pair of films to perform a laminating process, and a cutting unit configured to cut the pair of films after the laminating process. After the pair of films is cut in a width direction of the sheet in a space between the sheets, a movable blade having a round shape, of a part in which the film is removed, is allowed to pass through film portions in a vicinity of four corners of the sheet, so that a corner of a trailing end of a preceding laminated object and a corner of a leading end of a subsequent laminated object are cut simultaneously.

The invention of claim 5 employs a configuration that in the laminating apparatus according to claim 4, the cutting is performed during movement of the laminated object for conveyance.

The invention of claim 6 employs a configuration that in the laminating apparatus according to claim 5, a side surface of the movable blade from a surface that abuts the film first toward a thickness direction has a taper that retracts in an advancing direction of the laminated object, and an angle of the taper is equal to or smaller than an angle defined by a ratio Vs/Vf between a passing speed Vs in a vertical direction of the movable blade and a film delivering speed Vf.

The invention of claim 7 employs that in the laminating apparatus according to any one of claims 4 to 6, the round shape of the movable blade is an arcuate shape of a circle having a radius larger than longitudinal and lateral dimensions of a portion of the film to be cut.

The invention of claim 8 employs a configuration in the laminating apparatus according to any one of claims 4 to 7, after the film is cut in the width direction of the sheet, a conveying speed of the preceding laminated product is accelerated compared with a conveying speed of the subsequent laminated object, and at a time of cutting with the movable blade, a space is formed between both laminated objects.

The invention of claim 9 employs a configuration that in the laminating apparatus according to any one of claims 4 to 8, the movable blade is provided to a cut unit adjustable to be placed at an appropriate position in a film width direction.

The invention of claim 10 employs a configuration that in the laminating apparatus according to claim 9, the cut unit has a side slitter used for cutting both lateral edges of the film in order to obtain a margin in accordance with a size of the sheet at both lateral edges of the film before being cut by the movable blade.

The invention of claim 11 employs a configuration that in the laminating apparatus according to claim 10, the movable blade for cutting vicinities of the four corners of the film and the side slitter for cutting both lateral edges in the width direction of the film are individually detachable from the cut unit.

Advantageous Effects of Invention

According to a first aspect of the invention, by merely opening the sheet feed unit, guiding the film from the film supply unit to the press-bonding mechanism unit and then closing the sheet feed unit, the film sufficiently winds around the heating roller. Accordingly, while the structure is simple and the cost is low, the film is easily loaded and is wound around the heating roller reliably. Therefore, it is possible to prevent generation of defective products due to insufficient heating of the film.

According to a second aspect of the invention, in the case where a roller is used at a film supply position in the film supply unit for ensuring winding of the film around the heating roller, a slipping brake capable of precisely adjusting the brake tension applied to the film is also connected to the roller, at the same time. Accordingly, it is possible to properly manage the film tension and to prevent generation of defective laminated objects.

According to a third aspect of the invention, since a slipping brake capable of precisely adjusting the brake tension applied to the film is connected to the counter roller in the sheet feed unit, it is possible to properly manage the film tension and to prevent generation of defective laminated objects. In that case, the film supply unit side facing the counter roller may be a pad instead of the roller.

According to a fourth aspect of the invention, it is possible to automatically cut the four corners of the laminated object. Accordingly, it is possible to prevent injury and damages on other articles that may be caused by right angles at the four corners immediately after the laminating process. Therefore, it is possible to use the laminated product immediately after it is taken out from the laminating apparatus.

According to a fifth aspect of the invention, since the corner can be cut during conveyance of the laminated product in the apparatus, it is possible to finish the process at a processing speed of a conventional laminating apparatus.

According to a sixth aspect of the invention, in the cutting of a corner by the movable blade, even if the laminated object is moved for conveyance during the cutting operation, a side surface in the thickness direction of the movable blade has a taper so as to retract in the advancing direction of the laminated object. Accordingly, it is possible to finish the process at the processing speed of the conventional laminating apparatus without reducing the conveying speed of the laminated object even in the cutting operation.

According to a seventh aspect of the invention, since the shape of the movable blade is an arcuate shape of a circle having a radius larger than the longitudinal and lateral dimensions of the portion where the film is cut, an end portion of the movable blade is located outside a film end portion. Therefore, an edge of the end portion of the movable blade is not generated on the film side with respect to variations of the cutting position, so that the laminated object has a nicely cut corner portion.

According to an eighth aspect of the invention, since a space is formed between the preceding laminate object and the subsequent laminated object, at the time of cutting the corner portion by the movable blade, there is a margin between a cutting end portion of the preceding film and a cutting end portion of the subsequent film, and an end portion of a cutting shape of the movable blade also has a width. This improves strength of the movable blade.

According to a ninth aspect of the invention, since the movable blade can be adjusted to be placed at an appropriate position in the film width direction, it is possible to cope with a sheet having any width by adjusting the position.

According to a tenth aspect of the invention, since cut positions of both side edges in the width direction of the film are also determined in accordance with a width of the sheet as in the case of cutting the corner portion, by providing a side slitter for cutting both edges in the width direction of the film to the same cut unit, it is possible to reduce the number of components, improve accuracy of the cutting position, and speed up the processing.

According to an eleventh aspect of the invention, the movable blade for cutting the four corners of the film and the side slitter for cutting both edges in the width direction of the film are independently replaceable. Therefore, when a failure occurs, only a failed part can be replaced. Accordingly, maintenance and inspection become easy, and serviceability is improved.

BRIEF DESCRIPTION OF DRAWINGS

FIG. 1 is a perspective view of a laminating apparatus of the present invention.

FIG. 2 is a side sectional view of the laminating apparatus of the present invention.

FIG. 3 is a side sectional view illustrating a state in which an upper unit and a sheet feed unit of the laminating apparatus of the present invention are opened.

FIG. 4 is a perspective view illustrating a structure of a rotary cutter unit.

FIG. 5 illustrates a cut unit, in which FIG. 5(A) is a plan view of the entire cut unit, and FIG. 5(B) is a perspective view illustrating a structure of a side slitter in the cut unit.

FIG. 6 illustrates an R cut unit, in which FIG. 6(A) is a plan view, FIG. 6(B) is a side view of a movable blade, and FIG. 6(C) is an enlarged side view for explaining a shape of the movable blade.

DESCRIPTION OF EMBODIMENTS

Embodiments of the present invention will be described below with reference to the accompanying drawings.

As illustrated in FIGS. 1 and 2, a laminating apparatus 1 of the present invention is configured such that a sheet feed tray 3 is provided to a front side of an apparatus main body 2, and an output tray 4 is provided to a rear side thereof. The sheet feed tray 3 is used for stacking sheets to be laminated.

Further, as illustrated in FIG. 3, the apparatus main body 2 is configured such that an upper unit 5 and a sheet feed unit 6 are separable and openable, and an internal mechanism of the apparatus main body 2 is reachable by hand so that operation such as film loading can be performed.

First, the sheet feed tray 3 is a mechanism that ascends and descends by being driven by a sheet feed tray motor. Sheets stacked thereon also ascend and descend together with the sheet feed tray 3.

For performing a sheet feeding operation, the sheet feed tray 3 and the sheets stacked thereon are raised, and when a sheet sensor detects that an uppermost surface of the sheet has reached a predetermined height, raising is stopped.

In that state, the uppermost sheet is drawn into a sheet feed mechanism unit 10 in the sheet feed unit 6 at a front side of the apparatus main body 2, with use of a draw-in roller 11. The draw-in roller 11 is lowered from above a sheet onto a surface of the sheet by an operation of a sheet feed solenoid. Note that the draw-in roller 11 operates by being driven by a sheet feed motor.

Then, the draw-in roller 11 is brought into contact with the surface of the sheet, and the sheet feed motor is operated to rotate the draw-in roller 11, whereby the sheet is drawn into the laminating apparatus 1.

The sheet drawn into the sheet feed mechanism unit 10 by the draw-in roller 11 is separated by a pair of rollers, namely an upper sheet feed roller 12 and a lower separation roller 13 (rotating in a direction opposite to that of the upper sheet feed roller 12). Even if a plurality of sheets are delivered, only a top sheet is delivered to a rear side of these rollers. In other words, the sheets other than a target one is drawn back to the sheet feed tray 3 side.

The upper sheet feed roller 12 and the lower separation roller 13 are pressed against each other with a predetermined pressure by a spring mechanism. Further, the lower separation roller 13 has a torque limiter built therein. In a state where only one sheet is interposed, the lower separation roller 13 rotates in a forward direction while overcoming the torque limiter.

Rotation of the upper sheet feed roller 12 is started at the same timing as start of rotation of the draw-in roller 11, and after a sheet reaches conveyance rollers 14 and 15 provided behind, the rotation is stopped. The lower separation roller 13 also operates at a same timing as the draw-in roller 11.

The sheet delivered into the apparatus main body 2 one by one by the sheet feed mechanism unit 10 having the above-described configuration is delivered to a rear side by conveyance rollers 14 and 15, and is delivered up to a press-bonding mechanism unit 30 for press-bonding the sheet with films described below.

As an operation mechanism of the conveyance rollers 14 and 15, the lower conveyance roller 15 rotate by being driven by a conveyance motor, and the upper conveyance roller 14 is pressed against the lower conveyance roller 15 by a spring mechanism, and rotates following the lower conveyance roller 15.

The conveyance motor for driving the conveyance rollers 14 and 15 uses a stepping motor, and has a mechanism capable of performing switching between high speed conveyance and low speed conveyance that is the same as a speed of pressing rollers 33 and 34 of the press-bonding mechanism unit 30.

In the case of sending two or more sheets in succession for a laminating process, when the conveyance rollers 14 and 15 are started to feed the subsequent sheet, they are rotated at a high speed to thereby make an interval between the leading edge of the subsequent sheet and the trailing edge of the preceding sheet close to each other have a predetermined distance. After approaching the predetermined distance, the conveyance motor is switched to a low speed, and the sheet is sent at the same speed as that of the preceding sheet.

Two films 21a and 21b that sandwiches the sheet are fed from the film supply unit 20 in order to perform a laminating process. Each of the films 21a and 21b is wound around the film shaft 22 to form a cylindrical shape. The upper film 21a is held in such a manner that the upper cover 7 of the upper unit 5 is opened and the film shaft 22 is pivotally supported in the upper film holder 23.

The lower film 21b is held in such a manner that the lower cover 8 below the sheet feed tray 3 is opened and the lower film 21b is held the lower film holder 24. After being held by the upper and the lower film holders 23 and 24, the upper unit 5 and the sheet feed unit 6 are opened, and the leading ends of the upper and lower films 21a and 21b are passed between the openings, and are finally output to an output tray 4 outside the apparatus main body 2 from between the discharge rollers 80 and 81.

The upper unit 5 is opened by being turned upward around a fulcrum shaft 16 provided at an upper rear side of the apparatus main body 2, and the sheet feed unit 6 is released by turning frontward the upper side thereof around a fulcrum shaft 17 provided at a lower front side of the on the front lower side of the apparatus main body 2.

As illustrated in FIG. 3, an inside of the upper unit 5 is provided with an upper side of a film supply unit 20 (upper film holder 23, brake roller 25a, pulley 26a, timing belt 27a, and the like) and an upper side of the press-bonding mechanism unit 30 (heating roller 31, pressing roller 33, pull roller 35, and the like). An inside of the sheet feed unit 6 is provided with a draw-in roller 11, a sheet feed solenoid, a sheet feed motor, a sheet feed roller 12, a separation roller 13, the conveyance rollers 14 and 15, and counter rollers 18 and 19 described below. Further, the sheet feed tray 3 is attached to a front surface or the sheet feed unit 6.

The upper unit 5 and the sheet feed unit 6 are closed in a state where the upper and lower films 21a and 21b are loaded. The upper and lower films 21a and 21b are wound around the upper and lower heating rollers 31 and 32 of the press-bonding mechanism unit 30, respectively, in accordance with an operation of closing the sheet feed unit 6, and then sandwiched between the pressing rollers 33 and 34.

The sheet fed from the sheet feed mechanism unit 10 is sandwiched between the films 21a and 21b by the press-bonding mechanism unit 30. The press-bonding mechanism unit 30 has a mechanism of melting glue on film surfaces and press-bonding the films on the sheet.

On a front lower side of the upper film holder 23, the brake roller 25a has a braking function by being connected with a shaft incorporating a slipping brake having a function of keeping a load torque constant, via the pulley 26a and a timing belt 27a. A predetermined braking force can be applied to the film by sandwiching the film 21a between the brake roller 25a and the counter roller 18 held by the sheet feed unit 6.

The slipping brake gives a constant tension while slipping between the pulley 26a and the shaft. The tension is mechanically adjustable, and can be adjusted to have an optimum braking force (tension) for drawing depending on a material, thickness, and the like of the film 21a for lamination.

The counter roller 18 facing the brake roller 25a is held by the aforementioned sheet feed unit 6. The counter roller 18 has a mechanism that when it is closed toward the main body side with a lower fulcrum shaft 17 being used as a fulcrum, the counter roller 18 presses the film 21a against the brake roller 25a.

Structures and operations of a brake roller 25b, a pulley 26b connected with the shaft of the slipping brake, a timing belt 27b, and the counter roller 19 held by the sheet feed unit 6, that are provided above the lower film holder 24, are the same as the structures and operations of the brake roller 25a, the pulley 26a connected with the shaft of the slipping brake, the timing belt 27a, and the counter roller 18 described above. Further, the same action is exerted on both the upper film 21a and the lower film 21b.

Further, each of the heating rollers 31 and 32 and the pressing rollers 33 and 34 of the press-bonding mechanism unit 30 has a quartz tube heater inside thereof. The quartz tube heater detects temperature of a surface of each roller and controls the temperature. When it detects a temperature lower than a predetermined temperature, control is made to electrify the quartz tube heater, while when it detects a temperature exceeding the predetermined temperature, control is made to stop electrification of the quartz tube heater.

With the structure configured of the brake rollers 25a and 25b and the counter rollers 18 and 19, it is possible to set a braking force at a time of drawing out the film 21a or 21b. Moreover, at a time of closing the sheet feed unit 6, as the counter rollers 18 and 19 cause the films 21a and 21b, drawn from the upper and lower film holders 23 and 24, to be temporarily retracted to positions of the brake rollers 25a and 25b, and then guided to the heating rollers 31 and 32 provided at front, the films 21a and 21b are wound around the heating rollers 31 and 32 at a larger angle, so that sufficient heating can be performed.

In the structure of setting the braking force at the time of drawing out the films 21a and 21b, it is also possible to have a structure in which the counter rollers 18 and 19 have a function of the brake rollers 25a and 25b in the drawing. That is, the counter rollers 18 and 19 are connected with the slipping brake via the pulleys 26a and 26b and the timing belts 27a and 27b, as similar to the structure of the brake rollers 25a and 25b in the drawing.

By adopting the structure as described above, a predetermined braking force can be applied to the films 21a and 21b wound around the counter rollers 18 and 19. In the case of such a structure, the film supply unit 20 side (positions where the brake rollers 25a and 25b are located in FIGS. 2 and 3) facing the counter rollers 18 and 19 having a braking function may be provided with typical rollers, or may have pads instead of rollers.

Then, the films 21a and 21b to which preheating is applied by the heating rollers 31 and 32 are heated and pressed while sandwiching the upper and lower sides (front and back) of the sheet by the pressing rollers 33 and 34, whereby the glue on the films 21a and 21b is melted, and the films 21a and 21b are press-bonded to the sheet.

In this embodiment, the heating rollers 31 and 32 for applying preheating to the films 21a and 21b and the pressing rollers 33 and 34 for subsequent pressure bonding to an object to be laminated are different from each other. However, it is also possible that the heating roller and the pressing roller are the same to thereby perform heating and pressurization at the same time.

The laminated object, press-bonded by the press-bonding mechanism unit 30, is delivered to the pair of pull rollers 35 and 36 provided behind it. The aforementioned pressing rollers 33 and 34 and the subsequent pull rollers 35 and 36 are pairs of upper and lower rollers, respectively, serving as a mechanism for applying pressure to the laminated object. The upper rollers 33 and 35 have a structure of pushing the rollers downward by a spring mechanism, and the lower rollers 34 and 36 have a structure of pushing up by a cam mechanism. This pressure has a structure of rotating a vertical motion motor of the rollers to rotate the cam so that switching can be made between a pressurized state and a non-pressurized state.

Further, cooling fans 37 are provided above and below the pull rollers 35 and 36, to cool the films 21a and 21b after being pressed by the heating rollers 31 and 32 and the pressing rollers 33 and 34. This improves finishing quality of the laminating process.

The laminated object delivered to the pair of pull rollers 35 and 36 is further delivered to a rotary cutter unit 40 provided behind it. A structure of the rotary cutter unit 40 is as illustrated in FIG. 4. In the rotary cutter unit 40, a rear edge of the laminated object is allowed to pass between upper and lower blades, namely a rotary blade 42 and a straight blade 41, the straight blade 41 is lowered so as to cut at the middle between a trailing end of a previous sheet and a leading end of a subsequent sheet, a portion to be cut is sandwiched between it and the rotary blade 42, and the rotary blade 42 is rotated to cut a laminated portion of the films 21a and 21b. Note that excess laminated portions of the films 21a and 21b at a leading end portion of a first object and a trailing end portion of a last object are also cut in the same manner as described above.

The rotary blade 42 is driven by a main motor, and the rotary blade 42 is controlled to rotate once by driving it for a predetermined period of time via a stepping clutch.

The laminated object cut linearly in a width direction of the film is delivered to a cut unit 50 including a side slitter 60 and an R cut unit 70, by the delivery rollers 43 and 44.

As illustrated in FIG. 5(A), the cut units 50 are provided in pairs on both sides in the width direction and are fixed to one ring-shaped belt member 51, and are configured to be moved to a predetermined position by movement of the belt member 51 by rotation of a pulley 53 driven by the motor 52 and a driven pulley 54. The cut unit 50 moves bilaterally symmetrically in the width direction on the same center basis, with respect to a center portion of a sheet of the delivered laminated object. The amount of movement can be set by an operation panel.

First, the laminated object delivered from the delivery rollers 43 and 44 is processed such that both edges thereof in the width direction are cut by the side slitter 60 of the cut unit 50 provided at a predetermined position.

As illustrated in FIG. 5(B), the side slitter 60 is configured of upper and lower round blades 61 and 62. The lower round blade 62 rotates by being driven by a motor, and the upper round blade 61 is pressed against the lower round blade by a spring 63. When the laminated object is delivered to this part, a side portion is cut linearly.

Regarding the laminated object with the side portion being cut, a corner portion is cut by the R cut unit 70 that is integrated with the same side slitter 60 and is provided behind the right and left cut units 50.

As illustrated in FIG. 6, the R cut unit 70 is configured of a fixed blade 71 that is fixed, and a movable blade 72 that sandwiches the laminated object with the fixed blade 71 from above and punches out the laminated object.

The movable blade 72 is fixed to a shaft 74 that is rotated by a motor 73. When the motor 73 is rotated, the movable blade 72 rotates toward the fixed blade 71 from a stopped position to cut a corner portion of the laminated object while sandwiching it from above.

Corner cutting of a leading end portion of a first sheet is performed by rotating the movable blade 72 at timing when it is detected that the leading end portion of a laminated object delivered from the side slitter 60 reaches a predetermined position. Corner cutting of a trailing end portion of the first sheet and corner cutting of a leading end portion of a second sheet are performed by one rotation of the movable blade 72 performed at a predetermined timing.

In that case, when the first laminated object is removed from the delivery rollers 43 and 44 and only a delivery force of the discharge rollers 80 and 81 is received, the speed is accelerated. Accordingly, due to a difference from the conveyance speed of the delivery rollers 43 and 44, a space is formed between the trailing end portion of the first laminated object and the leading end portion of the second laminated object.

Shapes of the movable blade 72 and the fixed blade 71 are determined according to the space.

It should be noted that the present embodiment has a mechanism that when the laminated object engages with the delivery rollers 43 and 44 and has also reached the discharge rollers 80 and 81, the speed of the discharge rollers 80 and 81 is the same as the speed of the delivery rollers 43 and 44, while when it is out of the delivery rollers 43 and 44, the discharge rollers 80 and 81 rotate at a speed higher than that of the delivery rollers 43 and 44. This mechanism is realized in such a manner that a torque limiter is put in a drive portion of the discharge rollers 80 and 81, and a difference between a drive torque of the discharge rollers 80 and 81 in a state where the laminated object engages with the delivery rollers 43 and 44 and a drive torque of the discharge rollers 80 and 81 in a state where the laminated object is out of the discharge rollers 80 and 81.

In addition, the R-cut movable blade 72 must have a thickness, and in order to cut a corner portion of a laminated object, the laminated object is advanced at a time of a first cut by the movable blade 72 and during a time that the movable blade 72 passes by. Accordingly, there is a problem that the laminated object strikes in a last part where the movable blade 72 passes by.

In order to avoid this problem, the movable blade 72 has a tilt in a thickness direction, that is, a direction in which the laminated object advances (see FIG. 6(B)). Note that an inclination angle R is set to be smaller than a ratio Vs/Vf between a speed Vs that the movable blade 72 cuts and passes and a speed Vf that the laminated object advances (see FIG. 6(C)).

Further, in order to prevent a space from being formed between the laminated object and the fixed blade, a pair of guide rollers for bringing the laminated object close to the fixed blade is provided in an approaching portions at front and back thereof of a level not interfering with movement of the movable blade (not illustrated). The pair of guide rollers is rotated so as to assist conveyance of the laminated object in an advancing direction. A rotational speed thereof is set so as to substantially match a conveying speed of the laminated object.

In addition, an R shape of the fixed blade 71 and the movable blade 72 for R cutting is set to have a diameter R slightly larger than a diameter R in the design. Thereby, with respect to variations of a space formed between the trailing end of the first sheet and the leading end of the second sheet of the laminated objects due to mechanical variation, no trace of an end portion of an R portion appears.

When the movable blade 72 or the R cut unit 70 including it and the side slitter 60 have a structure in which they are independently removable from the cut unit 50, if any of the cutters fails, only a failed side can be replaced immediately. Therefore, maintenance and inspection become easy, and serviceability is improved.

When the laminated object after the cutting is delivered from the discharge rollers 80 and 81 to the output tray 4, lamination is completed. In the laminated object on the output tray 4, longitudinal and lateral margins of the films are cut to have optimum widths, and four corners are also cut in a round shape, so that it is safe and can be used for various purposes immediately.

While the embodiment of the laminating apparatus of the present invention has been described above, the present invention is not limited to the contents of the above-described embodiment, and can be implemented by appropriately changing the design within the scope of the object of the present invention.

REFERENCE SIGNS LIST 1 laminating apparatus
2 apparatus main body
3 sheet feed tray
4 output tray
5 upper unit
6 sheet feed unit
7 upper cover
8 lower cover
10 sheet feed mechanism unit
11 draw-in roller
12 upper sheet feed roller
13 lower separation roller
14, 15 conveyance roller
16 fulcrum shaft
17 fulcrum shaft
18 counter roller
19 counter roller
20 film supply unit
21a upper film
21b lower film
22 film shaft
23 upper film holder
24 lower film holder
25a, 25b brake roller
26a, 26b pulley
27a, 27b timing belt
30 press-bonding mechanism unit
31, 32 heating roller
33, 34 pressing roller
35, 36 pull roller
37 fan
40 rotary cutter unit
41 straight blade
42 rotary blade
43, 44 delivery roller
50 cut unit
51 belt body
52 motor
53 pulley
54 driven pulley
60 side slitter
61 upper round blade
62 lower round blade
63 spring
70 R cut unit
71 fixed blade
72 movable blade
73 motor
74 shaft
80, 81 discharge roller

The invention claimed is:

1. A laminating apparatus comprising:
a sheet feed mechanism unit including a sheet feed unit, the sheet feed mechanism unit being configured to convey a sheet to be laminated into an apparatus main body;
a film supply unit in which a pair of films for lamination is stored, a portion of the film supply unit storing one of the pair of films being separable from the apparatus main body; and
a press-bonding mechanism unit configured to, while sandwiching the sheet with the pair of films delivered from the film supply unit, heat and press-bond the sheet to perform a laminating process in the apparatus main body, wherein
the sheet feed unit is configured to be selectively positioned in an opened state and a closed state, the sheet feed unit being separated from the apparatus main body in the opened state and being connected with the apparatus main body in the closed state,
the film supply unit includes a roller or a pad at a film supply position such that each of the pair of films sufficiently winds around a heating roller of the press-bonding mechanism unit when the films are supplied to the press-bonding mechanism unit, and
the sheet feed unit includes a counter roller configured to abut the roller or the pad of the film supply unit when the sheet feed unit is in the closed state and separate from the roller or the pad of the film supply unit when the sheet feed unit is in the opened state, and when the sheet feed unit is in the closed state, the film is sandwiched between the roller or the pad of the film supply unit and the counter roller.

2. The laminating apparatus according to claim 1, wherein the film supply unit includes the roller, the roller being mechanically connected with a slipping brake adjustable to have a predetermined tension.

3. The laminating apparatus according to claim 1, wherein the counter roller of the sheet feed unit is mechanically connected with a slipping brake adjustable to have a predetermined tension.

4. A laminating apparatus comprising:
a sheet feed mechanism unit configured to convey a sheet to be laminated into an apparatus main body;
a film supply unit in which a pair of films for lamination is stored, a portion of the film supply unit storing one of the pair of films being separable from the apparatus main body;
a press-bonding mechanism unit configured to, while sandwiching the sheet with the pair of films delivered from the film supply unit, heat and press-bond the sheet to perform a laminating process; and
a cutting unit configured to cut the pair of films after the laminating process, wherein
the cutting unit has a movable blade having a round shape, the cutting unit is configured to cut the pair of films in a width direction of the sheet,
the movable blade is configure to, after the pair of films is cut in the width direction, in a space between sheets, pass through film portions in a vicinity of four corners of the sheet, so that a corner of a trailing end of a preceding laminated object and a corner of a leading end of a subsequent laminated object are cut simultaneously.

5. The laminating apparatus according to claim 4, wherein the cutting unit cuts the pair of films during movement of the preceding and subsequent laminated objects for conveyance.

6. The laminating apparatus according to claim 5, wherein a side surface of the movable blade from a surface that abuts the pair of films first toward a thickness direction has a taper that retracts in an advancing direction of the preceding and subsequent laminated objects, and an angle of the taper is equal to or smaller than an angle defined by a ratio Vs/Vf between a passing speed Vs in a vertical direction of the movable blade and a film delivering speed Vf.

7. The laminating apparatus according to claim 4, wherein the round shape of the movable blade is an arcuate shape of a circle having a radius larger than longitudinal and lateral dimensions of a portion of the pair of films to be cut.

8. The laminating apparatus according to claim 4, wherein after the cutting unit cuts the pair of films in the width direction of the sheet, a conveying speed of the preceding laminated object is accelerated compared with a conveying speed of the subsequent laminated object, and at a time of cutting with the movable blade, a space is formed between the preceding and subsequent laminated objects.

9. The laminating apparatus according to claim 4, wherein the movable blade is provided to a cut unit that is adjustable to be placed at an appropriate position in a film width direction.

10. The laminating apparatus according to claim 9, wherein the cut unit has a side slitter configured to cut both lateral edges in the width direction of the pair of films in order to obtain a margin in accordance with a size of the sheet at both the lateral edges in the width direction of the pair of films before being cut by the movable blade.

11. The laminating apparatus according to claim 10, wherein the movable blade and the side slitter are individually detachable from the cut unit.

\* \* \* \* \*